(12) United States Patent
Kim et al.

(10) Patent No.: US 8,296,994 B2
(45) Date of Patent: Oct. 30, 2012

(54) FILM SHEET FOR AREA FOCUSING OF SUN LIGHT AND GREENHOUSE PROVIDED WITH THE SAME

(75) Inventors: Seong-Il Kim, Seoul (KR); Won-Jun Choi, Seoul (KR); Il-Ki Han, Seoul (KR); Jung-Il Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 12/962,724

(22) Filed: Dec. 8, 2010

(65) Prior Publication Data

US 2011/0138688 A1 Jun. 16, 2011

(30) Foreign Application Priority Data

Dec. 15, 2009 (KR) .................. 10-2009-0124390
Aug. 16, 2010 (KR) .................. 10-2010-0078925

(51) Int. Cl.
*A01G 9/24* (2006.01)
(52) U.S. Cl. .................................. 47/17; 47/29.3
(58) Field of Classification Search .......... 47/17, 19.1, 47/20.1, 29.1, 29.2, 29.3, 29.4, DIG. 6; 136/246, 136/243, 259, 251, 206; 126/621, 622; 359/625, 359/640, 831, 834, 833, 837, 593, 591, 742
See application file for complete search history.

(56) References Cited

U.S. PATENT DOCUMENTS

| | | | |
|---|---|---|---|
| 7,227,077 B2 * | 6/2007 | Kleinwachter | 136/248 |
| 8,061,080 B2 * | 11/2011 | Loebl et al. | 47/58.1 LS |
| 2001/0054252 A1 * | 12/2001 | Kleinwachter | 47/17 |
| 2007/0113883 A1 | 5/2007 | Rhee et al. | |
| 2007/0184274 A1 * | 8/2007 | Wheatley et al. | 428/411.1 |
| 2008/0041441 A1 | 2/2008 | Schwartzman | |
| 2009/0158647 A1 * | 6/2009 | Kleinwaechter | 47/17 |

FOREIGN PATENT DOCUMENTS

| | | |
|---|---|---|
| JP | 11-326605 | 11/1999 |
| KR | 10-0466257 | 1/2005 |
| KR | 20-0390785 | 7/2005 |
| KR | 20-0419531 | 6/2006 |

* cited by examiner

*Primary Examiner* — T. Nguyen

(74) *Attorney, Agent, or Firm* — Lexyoume IP Meister, PLLC.

(57) ABSTRACT

A film sheet for area-focusing of sunlight and a greenhouse provided with the same are provided. A film sheet includes i) a film having a rectangular shape, and ii) a plurality of prism assemblies formed on one surface of the film to extend in one direction. At least one prism assembly of the plurality of prism assemblies includes i) at least one first prism unit including a plurality of first prisms with slanted angles that are substantially the same as each other, and ii) at least one second prism unit neighboring the first prism unit and including a plurality of second prisms with slanted angles that are substantially the same as each other. The width of the first prism unit is substantially the same as the width of the second prism unit and a slanted angle of one first prism among the plurality of first prisms is different from a slanted angle of one second prism among the plurality of second prisms, and light entering the prism assembly is configured to be area-focused.

6 Claims, 15 Drawing Sheets

FILM SHEET FOR AREA FOCUSING OF SUN LIGHT AND GREENHOUSE PROVIDED WITH THE SAME

CROSS-REFERENCE TO RELATED APPLICATION

This application claims priority to and the benefit of Korean Patent Application No. 10-2009-0124390 and 10-2010-0078925 filed in the Korean Intellectual Property Office on Dec. 15, 2009 and Aug. 16, 2010, the entire contents of which are incorporated herein by reference.

BACKGROUND OF THE INVENTION (a) Field of the Invention

The present invention relates to a film sheet and a greenhouse provided with the same, and more specifically, to a film sheet for area-focusing of sunlight and a greenhouse provided with the same.

(b) Description of the Related Art

Recently, research and development on clean and renewable energy has been actively conducted due to depletion and increasing price of the natural resources such as fossil fuel and oil etc. Examples of the clean and renewable energy include a solar energy, wind energy, tidal energy, and so on. Particularly, a research and development on effectively using solar energy to conserve natural resources has been actively conducted.

It is important to increase the efficiency of focusing sunlight in order to effectively use the solar energy. Therefore, a Fresnel lens, which can raise the efficiency of focusing sunlight, has been developed and used. The Fresnel lens is manufactured to have a single focus for point-focusing light. In this case, intensity of the beam has a Gaussian distribution. That is, intensity of the beam is greatest at the center at which the focus is located and the intensity of the beam becomes weaker going to an edge thereof.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a film sheet to focus the incident sunlight uniformly within a predetermined area. In addition, the present invention has been made in an effort to provide a greenhouse provided with the film sheet.

An exemplary embodiment of the present invention provides a film sheet including i) a film having a rectangular shape, and ii) a plurality of prism assemblies formed on one surface of the film to extend in one direction. At least one prism assembly of the plurality of prism assemblies includes i) at least one first prism unit including a plurality of first prisms with slanted angles that are substantially the same as each other, and ii) at least one second prism unit neighboring the first prism unit and including a plurality of second prisms with slanted angles that are substantially the same as each other. The width of the first prism unit is substantially the same as the width of the second prism unit, a slanted angle of one first prism among the plurality of first prisms is different from a slanted angle of one second prism among the plurality of second prisms, and light entering the prism assembly is configured to be area-focused.

The film sheet may further include a third prism unit neighboring the first prism unit and including at least one third prism that extends in the one direction. In this case, the first prism unit is located between the second prism unit and the third prism unit. The slanted angle of at least one of the second prism among the plurality of second prisms may be greater than the slanted angle of at least one of the first prism among the plurality of first prisms. The number of the plurality of second prisms may be greater than the number of the plurality of first prisms.

The heights of the plurality of first prisms may be substantially the same as the heights of the plurality of second prisms, and the lengths of slanted surfaces of the plurality of first prisms may be greater than the lengths of slanted surfaces of the plurality of second prisms. The at least one first prism unit may include a pair of first prism units, and the pair of first prism units may be located symmetrically with respect to a center line of the prism assembly that is parallel to the one direction. The film sheet may further include a non-focusing area including the center line and positioned between the pair of first prism units. In this case, the width of the non-focusing area is substantially the same as the width of the first prism unit.

The width of the prism assembly may be 3 to 10 times as great as the width of the area-focused region. The film sheet may further include another plurality of prism assemblies formed on another surface of the film facing a direction opposite a direction that the one surface of the film faces to extend in the one direction. The film sheet may further include a pair of cover films covering the plurality of prism assemblies and the other plurality of prism assemblies, respectively.

Another exemplary embodiment of the present invention provides a film sheet including i) a film having a circular shape, and ii) a plurality of prism assemblies formed on one surface of the film. One prism assembly of the plurality of prism assemblies includes i) at least one first prism unit including a plurality of first prisms with slanted angles that are substantially the same as each other, and ii) at least one second prism unit neighboring the first prism unit, having the same center as the first prism unit, and including a plurality of second prisms with slanted angles that are substantially the same as each other. The width of the first prism unit is substantially the same as the width of the second prism unit, a slanted angle of one first prism among the plurality of first prisms is different from a slanted angle of one second prism among the plurality of second prisms, and light entering the prism assembly is configured to be area-focused. The film sheet may be used in a sunlight focusing apparatus.

Yet another exemplary embodiment of the present invention provides a greenhouse including i) a support frame including a cover unit, and ii) a film sheet covering the cover unit. The film sheet includes i) a film having one rectangular surface, and ii) a plurality of prism assemblies arranged on the film to neighbor each other. One prism assembly of the plurality of prism assemblies includes i) at least one first prism unit including a plurality of first prisms with slanted angles that are substantially the same as each other, and ii) at least one second prism unit neighboring the first prism unit and including a plurality of second prisms with slanted angles that are substantially the same as each other. The width of the first prism unit is substantially the same as the width of the second prism unit, a slanted angle of one first prism among the plurality of first prisms is different from a slanted angle of one second prism among the plurality of second prisms, and light entering the prism assembly is configured to be area-focused.

The plurality of first prisms and the plurality of second prisms may be formed to extend in a direction in which a greenhouse extends. The prism assembly may be formed in a circular shape, the second prism unit may surround the first prism unit, and the first prism unit and the second prism unit may have the same center. The slanted angle of at least one of the second prisms among the plurality of second prisms may be greater than the slanted angle of at least one of the first prisms among the plurality of first prisms. The number of the plurality of second prisms may be greater than the number of the plurality of first prisms. The heights of the plurality of first prisms may be substantially the same as the heights of the plurality of second prisms, and the lengths of slanted surfaces of the plurality of first prisms may be greater than the lengths of slanted surfaces of the plurality of second prisms.

The width of the prism assembly may be 3 to 10 times as great as the width of the area-focused region. The cover unit may be formed in a curved surface shape, each of the plurality of prism assemblies may be positioned having a curvature along the width direction of the corresponding prism assembly, and the curvature may be in inverse proportion to the width of the area-focused region.

According to the exemplary embodiment of the present invention, it is possible to easily form a lens pattern, which is necessary to be provided with a plurality of focuses, on a single film. As a result, productivity of the film sheet is improved, manufacturing cost thereof is minimized, and transportation and treatment are easy. In addition, efficiency of focusing sunlight can be largely improved by the film sheet.

If the film sheet is adapted to the solar cell, light focusing efficiency of the solar cell can be improved since the sunlight is area-focused to have a uniform light intensity distribution at a predetermined area. As a result, the structure of the film sheet can be simplified to be relative to a Fresnel lens for point-focusing sunlight, appearance thereof can be improved, and manufacturing cost thereof can be reduced. In addition, the lifetime of the solar cell can be increased by preventing the solar cell from being thermally deteriorated. In addition, the amount of light that is incident on a predetermined area in a greenhouse provided with the film sheet can be relatively uniformly maintained. As a result, growing speed and yields of crops, which are harvested in the greenhouse, can be increased.

DETAILED DESCRIPTION OF THE EMBODIMENTS

The technical terms used herein are to simply mention a particular exemplary embodiment and are not meant to limit the present invention. An expression used in the singular encompasses the expression of the plural, unless it has a clearly different meaning in the context. In the present invention, it is to be understood that the terms such as "including" or "having," etc., are intended to indicate the existence of the specific features, regions, numbers, stages, operations, elements, components, or combinations thereof disclosed in the specification, and are not intended to preclude the possibility that one or more other specific features, regions, numbers, operations, elements, components, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have idealized or excessively formal meanings unless clearly defined in the present application.

The exemplary embodiments of the present invention described with reference to perspective views and sectional views substantially represent the ideal exemplary embodiments of the present invention. As those skilled in the art would realize, the described embodiments may be modified in various different ways, all without departing from the spirit or scope of the present invention.

Figure 1:
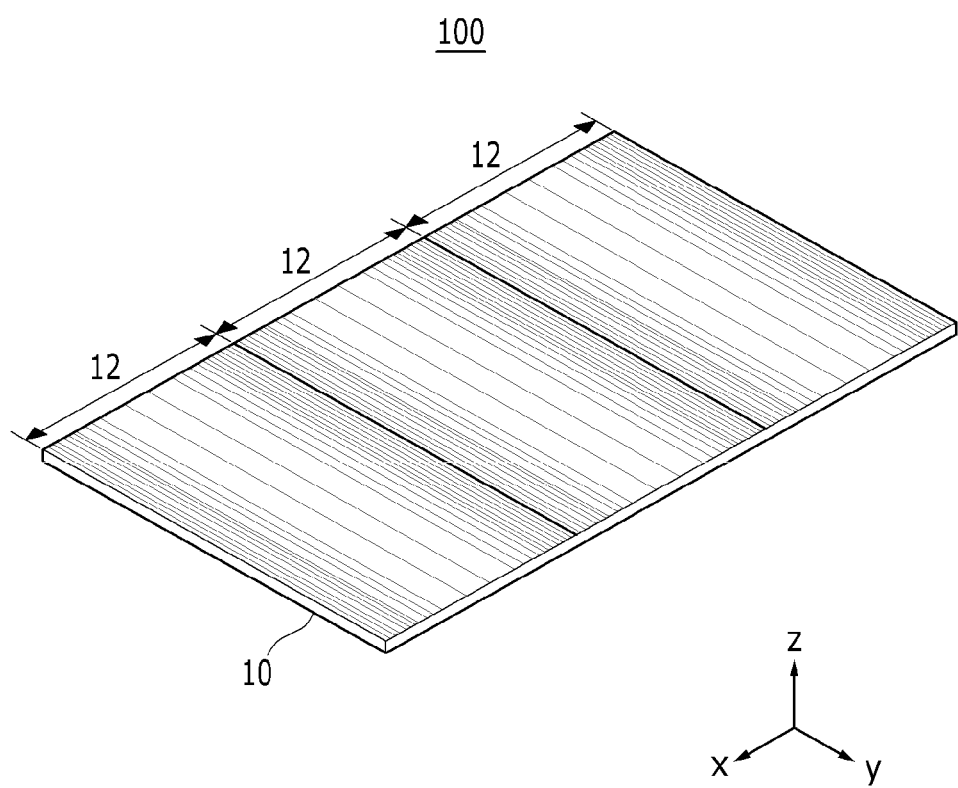
FIG. 1 is a schematic partial perspective view of a film sheet according to a first exemplary embodiment of the present invention.

FIG. 1 is a partial perspective view schematically showing a film sheet 100 according to a first exemplary embodiment of the present invention. The structure of the film sheet 100 of FIG. 1 is just an illustrative example of the present invention, and the present invention is not limited thereto. Therefore, the structure of the film sheet 100 can be variously modified.

As shown in FIG. 1, the film sheet 100 includes a film 10 and a plurality of prism assemblies 12. In addition, if necessary, the film sheet 100 may further include other components.

The film 10 may be manufactured in a thin film shape by using a resin such as PMMA (polymethylmethacrylate) or PC (polycarbonate), etc. In a case of using a material that is optically transparent in a wavelength range of 300 nm to 1700 nm as the material of the film 10, it is possible to more effectively use solar energy. In a case where a wavelength is out of the above-mentioned wavelength range, light loss occurs. The film 10 has a rectangular shape, and the prism assemblies 12 having a rectangular shape are formed on the film 10. FIG. 1 shows a case in which three prism assemblies 12 are formed on the film 10, but more prism assemblies may be formed on the film 10. Meanwhile, FIG. 1 shows the film 10 and the prism assemblies 12 separately formed, but the film 10 and the prism assemblies 12 may be formed as one body.

As shown in FIG. 1, a plurality of prism assemblies 12 are located to neighbor each other along an x-axis direction. Also, each prism assembly 12 is formed in one direction, that is, a y-axis direction on the film. Therefore, since the prism assemblies 12 perform area focusing by linearly emitting incident sunlight, in a case of using the prism assemblies 12 in a sunlight focusing apparatus or a greenhouse, light-use efficiency is improved.

Figure 2:
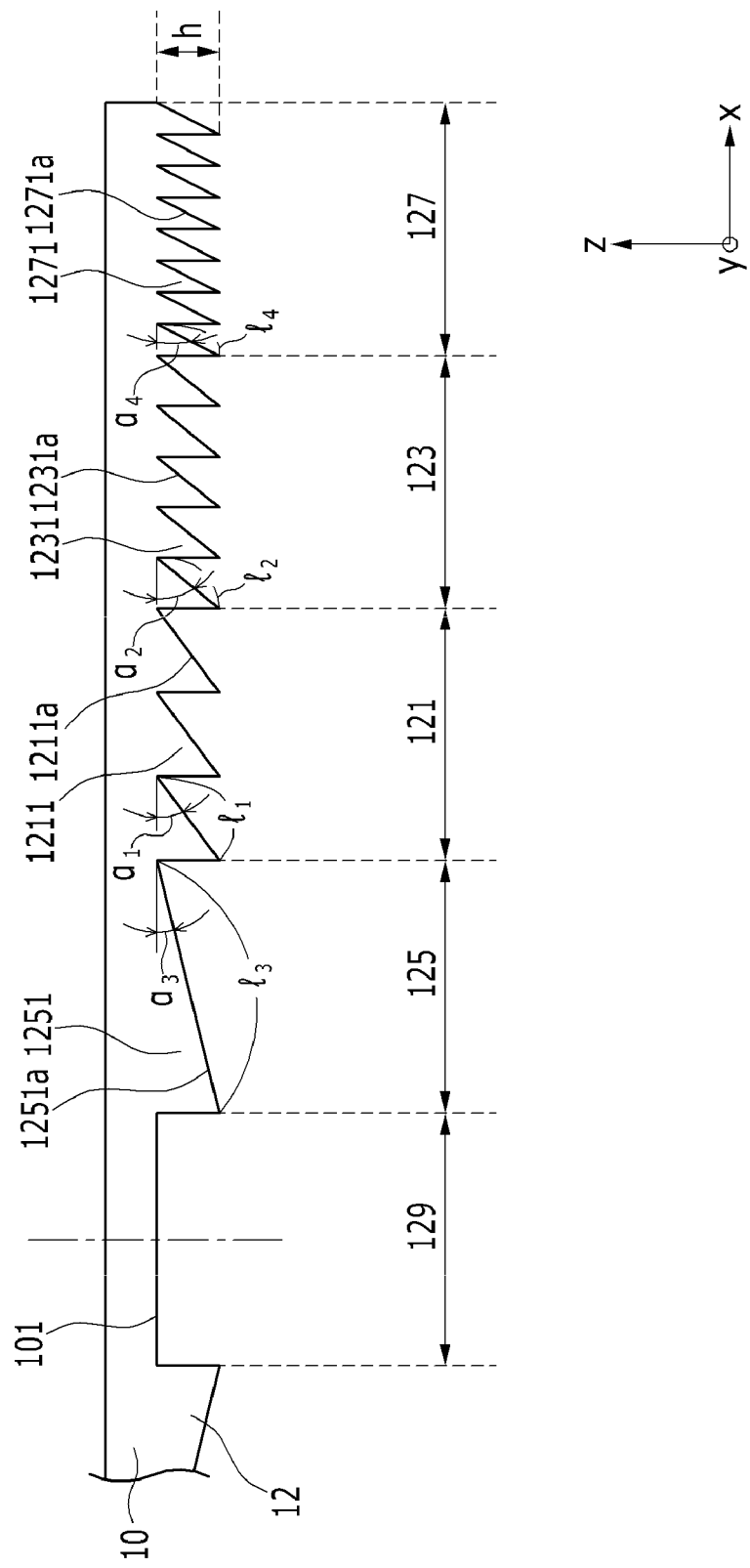
FIG. 2 is a schematic enlarged sectional view of a prism assembly of FIG. 1.

FIG. 2 is a schematic enlarged sectional view of a prism assembly 12 of FIG. 1.

As shown in FIG. 2, a prism assembly 12 includes a first prism unit 121, a second prism unit 123, a third prism unit 125, and a fourth prism unit 127. Here, a non-focusing region 129 is positioned at the center of the film sheet 100, and another first prism unit 121, another second prism unit 123, another third prism unit 125, and another fourth prism unit 127 are formed symmetrically on the left side (not shown) of the non-focusing region 129. No prism is formed in the non-focusing region 129 such that light entering the center of the prism assembly 12 directly enters a focused area.

The first prism unit 121 includes a plurality of first prisms 1211. The plurality of first prisms 1211 have a slanted angle $\alpha 1$ having a predetermined tolerance. Here, the slanted angle $\alpha 1$ means an angle of slanted faces 1211a of the first prisms 1211 to a plate surface 101 of the film 10. Meanwhile, the second prism unit 123 neighbors the first prism unit 121 and includes a plurality of second prisms 1231. The plurality of second prisms 1231 have a slanted angle $\alpha 2$ having a predetermined tolerance.

Further, the third prism unit 125 neighbors the first prism unit 121 and includes a plurality of third prisms 1251. The plurality of third prisms 1251 have a slanted angle $\alpha 3$ having a predetermined tolerance. The fourth prism unit 127 neighbors the second prism unit 123 and includes a plurality of fourth prisms 1271. The plurality of fourth prisms 1271 have a slanted angle $\alpha 4$ having a predetermined tolerance. Meanwhile, since the first prism unit 121, the second prism unit 123, the third prism unit 125, and the fourth prism unit 127 include the first prisms 1211 having the same shape, the second prisms 1231 having the same shape, the third prisms 1251 having the same shape, and the fourth prisms 1271 having the same shape, respectively, each of the first prism unit 121, the second prism unit 123, the third prism unit 125, and the fourth prism unit 127 refracts incident light at the same angle and emits the refracted light. The first prisms 1211, the second prisms 1231, the third prisms 1251, and the fourth prisms 1271 extend in one direction, that is, the y-axis direction, respectively.

Meanwhile, the first prisms 1211, the second prisms 1231, the third prisms 1251, and the fourth prisms 1271 include first slanted faces 1211a, second slanted faces 1211b, third slanted faces 1211c, and fourth slanted faces 1211d, respectively. Here, the length l1 of the first slanted faces 1211a, the length l2 of the second slanted faces 1211b, the length l3 of the third slanted faces 1211c, and the length l4 of the fourth slanted faces 1211d are in inverse proportion to distances of corresponding prism units to the non-focusing region 129. That is, the relationship of l3>l1>l2>l4 is satisfied.

Further, the first slanted angle $\alpha 1$, the second slanted angle $\alpha 2$, the third slanted angle $\alpha 3$, and the fourth slanted angle $\alpha 4$ that the first prisms 1211, the second prisms 1231, the third prisms 1251, and the fourth prisms 1271 form with the plate surface 101 of the film, respectively, are in proportion to distances of corresponding prism units to the non-focusing region 129. For example, the second slanted angle $\alpha 2$ of the second prisms 1231 is larger than the first slanted angle $\alpha 1$ of the first prisms 1211.

As shown in FIG. 2, the first prisms 1211, the second prisms 1231, the third prisms 1251, and the fourth prisms 1271 are all substantially the same in height h. Therefore, the number of the first prisms 1211 of the first prism unit 121, the number of the second prisms 1231 of the second prism unit 123, the number of the third prisms 1251 of the third prism unit 125, and the number of the fourth prisms 1271 of the fourth prism unit 127 are in proportion to distances of the corresponding prism units 121, 123, 125, and 127 to the non-focusing region 129. For example, the number of the plurality of second prisms 1231 is larger than the number of the plurality of first prisms 1211.

Figure 3:
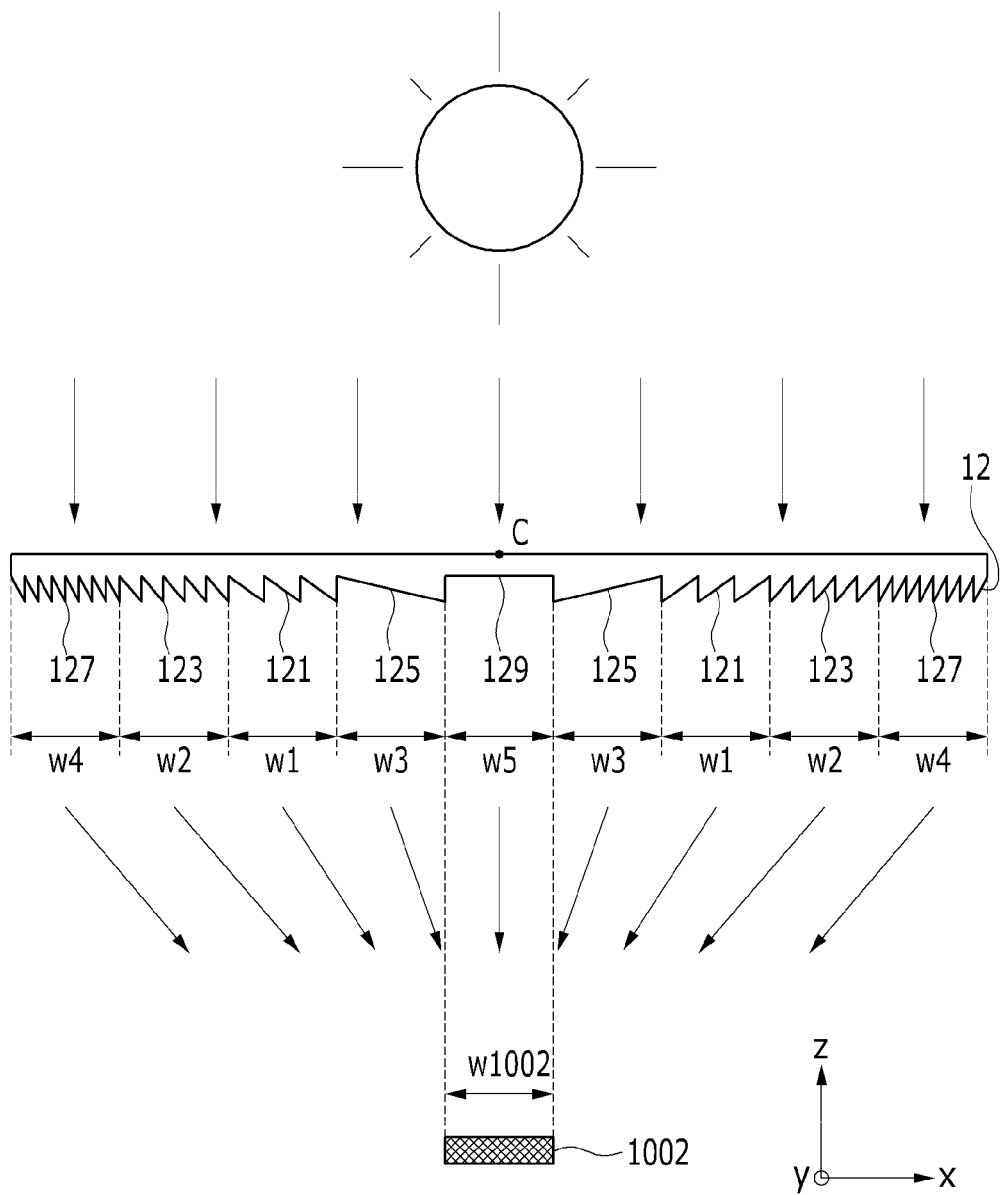
FIGS. 3 to 5 are schematic views of an area-focusing mechanism of the film sheet.

FIG. 3 schematically shows an operating state of the prism assembly 12 of FIG. 1. The operating state of the prism assembly 12 of FIG. 1 is just an illustrative example of the present invention, and the present invention is not limited thereto. Therefore, the operating state of the prism assembly 12 can be modified in various ways.

As shown in FIG. 3, a pair of first prism units 121, a pair of second prism units 123, a pair of third prism units 125, and a pair of fourth prism units 127 are symmetrically disposed with respect to the center line C passing through the center of the prism assembly 12. That is, a pair of first prism units 121, a pair of second prism units 123, a pair of third prism units 125, and a pair of fourth prism units 127 are positioned in bilateral symmetry with respect to the non-focusing region 129. Here, the non-focusing region 129 includes the center line C. The width w1 of the first prism unit 121, the width w2 of the second prism unit 123, the width w3 of the third prism unit 125, the width w4 of the fourth prism unit 127, and the width w5 of the non-focusing region 129 are substantially the same.

As shown by arrows in FIG. 3, light incident on the prism assembly 12 is area-focused to be incident on an area-focused region 1002. That is, light is focused not on a point but on an area, such that the area-focused region 1002 having a predetermined area is formed. As a result, it is possible to maximize the light-use efficiency in a case of using the prism assembly 12 to focus light in a greenhouse or a solar cell having a predetermined area.

Here, the width (2w1+2w2+2w3+2w4+w5) of the prism assembly 12 may be 3 to 10 times as great as the width w1002 of the area-focused region 1002. Since the light focusing is performed in the same width as the width of each of the first to fourth prism units, in order to reduce the focused area, the width of the prism assembly should be reduced in proportion to the focused area. Therefore, the width w1002 of the area-focused region 1002 is maintained in the above-mentioned range. Hereinafter, the area-focusing mechanism of the film sheet 100 (shown in FIG. 1) will be described in more detail with reference to FIGS. 4 and 5.

Figure 4:
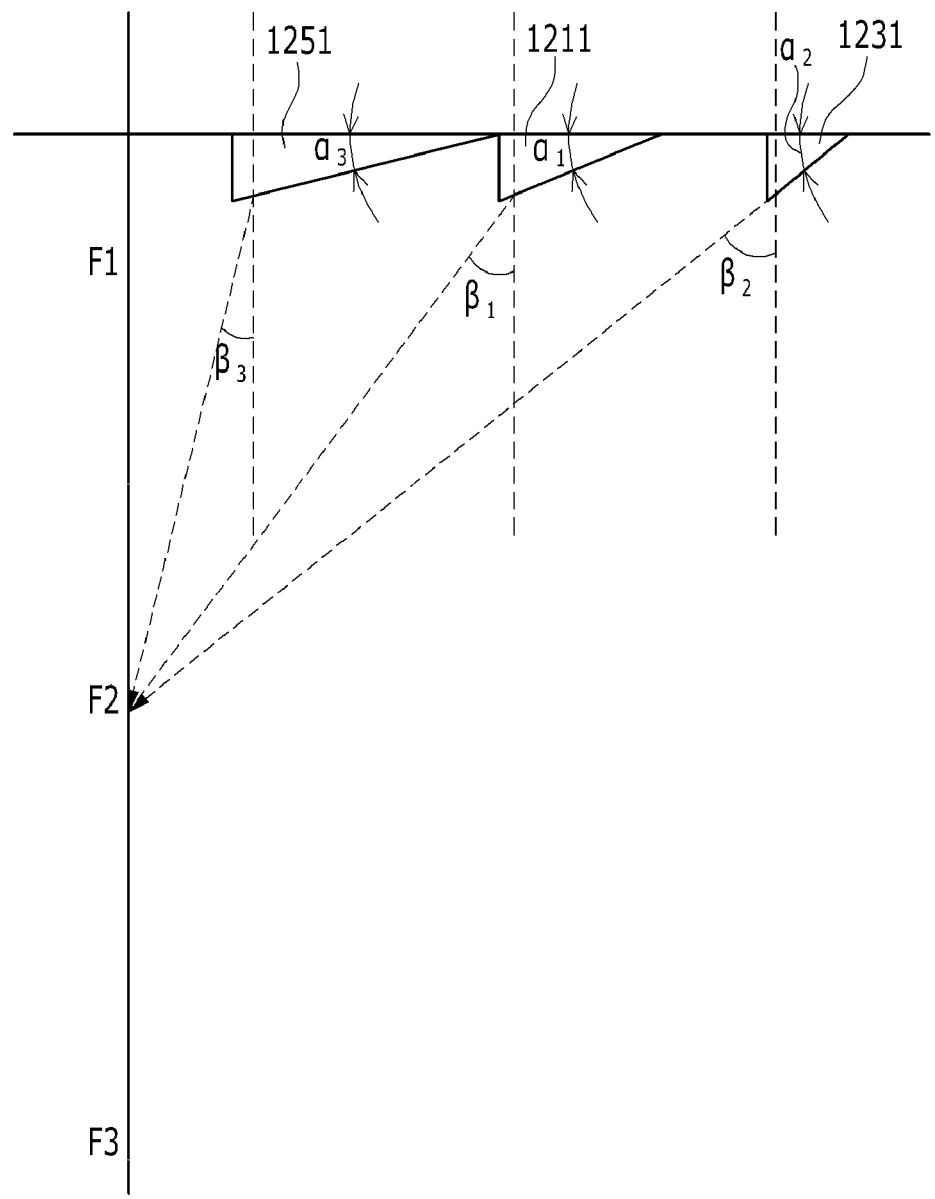

FIG. 4 schematically shows an area-focusing mechanism of the film sheet 100 (shown in FIG. 1). In FIG. 4, the propagation path of light is shown by dotted lines. For ease of explanation, in FIG. 4, only one prism (1251, 1121, and 1231) per prism unit is shown and the other prisms are not shown.

As shown in FIG. 4, light incident on the individual prisms 1251, 1211, and 1231 is refracted and gathered to a focus F2. Meanwhile, the other prisms disposed at positions other than the prisms 1251, 1211, and 1231 can gather light to the focus F2. That is, the prisms 1251, 1211, and 1231 are processed to have different slanted angles, thereby being capable of gathering all rays of light passing through the prisms to one focus F2.

In a case of making a design the prism assembly 12 so that the slanted angles $\alpha 1$, $\alpha 2$, and $\alpha 3$ of the individual prisms 1251, 1211, and 1231 become larger from the center to the edge, that is, from the left side to the right side, it is possible to gather light to the focus F2. In contrast, in a case of designing the prisms 1251, 1211, and 1231 to have the slanted angles $\alpha 1$, $\alpha 2$, and $\alpha 3$ being the same, all rays of light are refracted at the same angle, so the rays of light are not gathered to the focus F2. As described above, since the plurality of prisms 1251, 1211, and 1231 have different refraction angles β1, β2, and β3, the prisms 1251, 1211, and 1231 can gather light to the focus F2.

Meanwhile, light rays incident on the prisms that are included in each prism unit and have the same shape are refracted substantially at the same angle and irradiated onto a focused area. Therefore, the focused region has substantially uniform light intensity distribution. As a result, it is possible to focus light while uniformly maintaining the light intensity distribution by the prisms having the same shape and included in each prism unit. As a result, it is possible to form the area-focused region in which the light intensity distribution is uniformly maintained.

Figure 5:
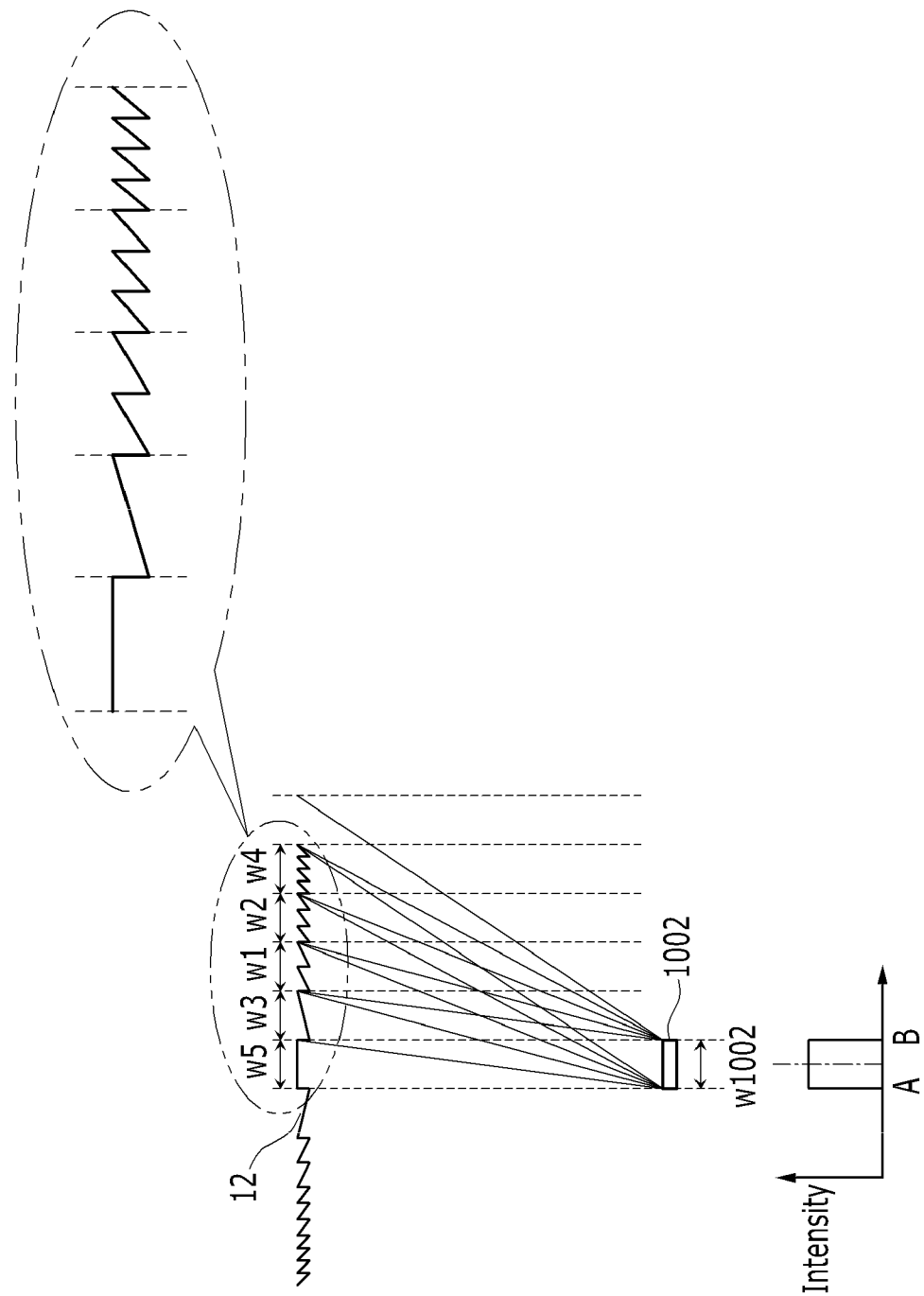

FIG. 5 is a graph schematically showing the strength of light focusing of the prism assembly 12 of FIG. 4. In the enlarged circle of FIG. 5, an enlarged view of the cross-sectional structure of the prism assembly 12 is shown.

As shown in FIG. 5, light rays incident on the prism assembly 12 are individually refracted and overlap on the focused area. As a result, the light rays are area-focused while overlapping each other over a segment AB. Further, since the prisms 1211, 1231, 1251, and 1271 (shown in FIG. 4) included in the prism units 121, 123, 125, and 127 (shown in FIG. 3) have the same shapes, it is possible to gather light rays to have uniform intensities. Since light rays are focused while overlapping each other, it is possible to obtain more uniform light intensity distribution as compared to a case in which light rays are point-focused.

As shown in FIG. 5, the light rays incident on the individual prism units 121, 123, and 125 (shown in FIG. 3) overlap each other on the segment AB corresponding to the area-focused region 1002. As a result, light intensities are uniformly distributed on the area-focused region 1002 corresponding to the segment AB, and the light intensity on the area-focused region 1002 corresponding to the segment AB is high. Here, the length of the segment AB is the same as the width w1002 of the area-focused region 1002.

Meanwhile, since all the prisms 1211, 1231, 1251, or 1271 of the prism unit 121, 123, 125, or 127 (shown in FIG. 2) have the same shapes, all the light rays are refracted at the same angle and propagate in parallel with each other. Although not shown in FIG. 5, since the left side portion of FIG. 5 has a symmetric shape, the left side portion can focus light on the same principle.

Figure 6:
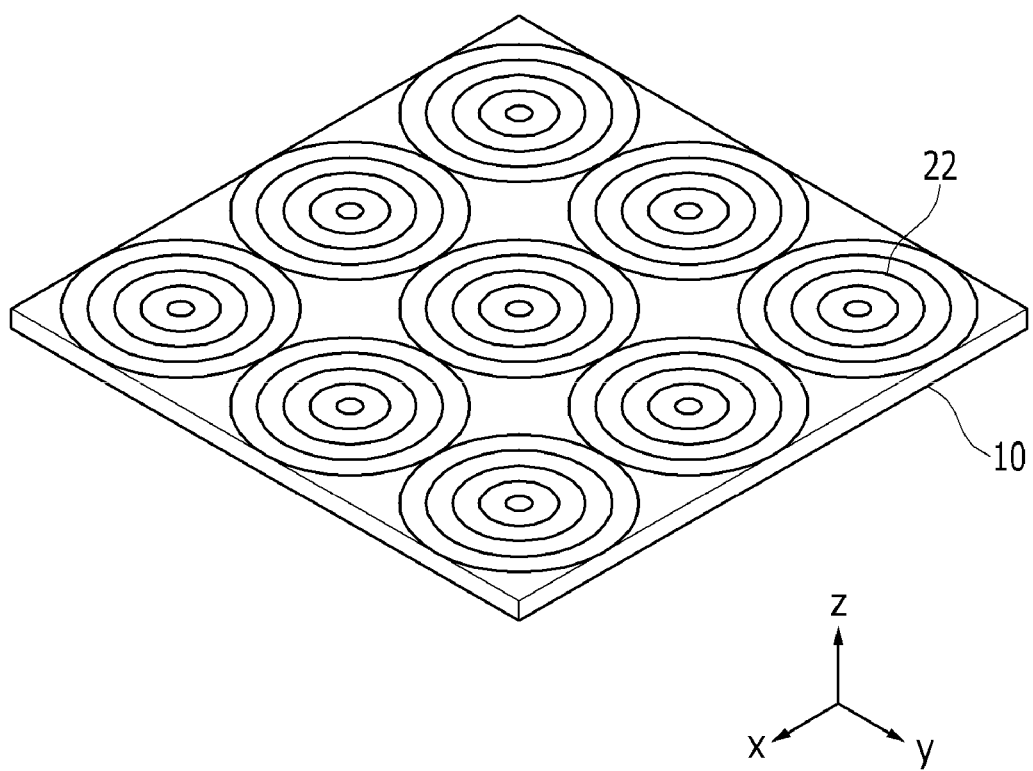
FIG. 6 is a schematic partial perspective view of a film sheet according to a second exemplary embodiment of the present invention.

FIG. 6 is a schematic partial perspective view of a film sheet 200 according to a second exemplary embodiment of the present invention. The structure of the film sheet 200 of FIG. 6 is just an illustrative example of the present invention, and the present invention is not limited thereto. Therefore, the structure of the film sheet 200 can be modified in other forms. Further, since the structure of the film sheet 200 of FIG. 6 is similar to the structure of the film sheet 100 of FIG. 1, identical parts are denoted by the same reference symbols, and a detailed description thereof is omitted.

As shown in FIG. 6, the film sheet 200 includes a film 10 and a plurality of circular prism assemblies 22. In addition, the film sheet 200 may further include other components if necessary. The plurality of circular prism assemblies 22 are regularly arranged in an array according to an x-axis direction and a y-axis direction. Hereinafter, a circular prism assembly 22 of FIG. 6 will be described in more detail with reference to FIG. 7.

Figure 7:
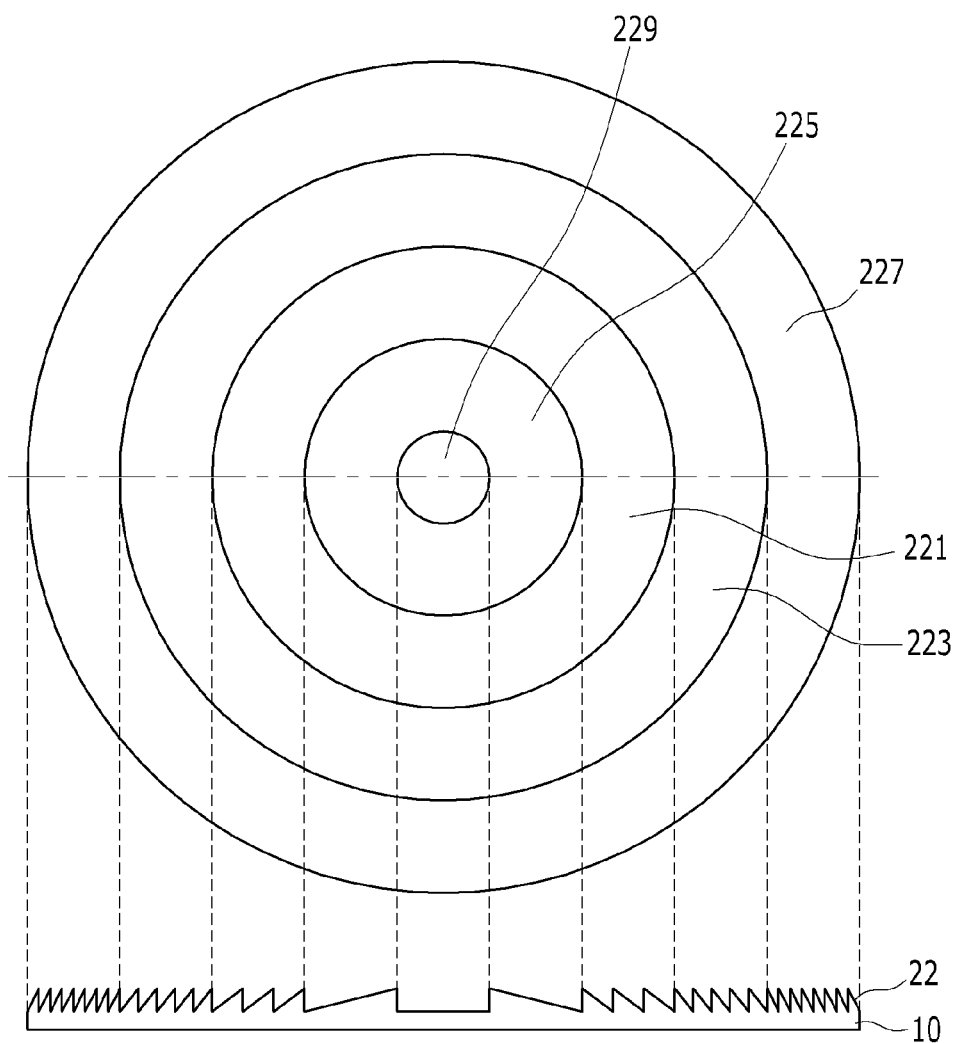
FIG. 7 is a view schematically illustrating a planar structure of a circular prism assembly of FIG. 6 and a cross-sectional structure corresponding thereto.

FIG. 7 schematically shows a planar structure of a circular prism assembly 22 of FIG. 6 and a cross-sectional structure corresponding thereto.

As shown in FIG. 7, the circular prism assembly 22 includes a first prism unit 221, a second prism unit 223, a third prism unit 225, a fourth prism unit 227, and a non-focusing region 229. In addition, the circular prism assembly 22 may further include other components if necessary.

In each of the first prism unit 221, the second prism unit 223, the third prism unit 225, and the fourth prism unit 227, prisms having substantially the same shape are formed toward the non-focusing region 220. Here, all of the first prism unit 221, the second prism unit 223, the third prism unit 225, and the fourth prism unit 227 are formed in ring shapes having the same center. The second prism unit 223 surrounds the first prism unit 221. Since the shapes of the prisms of each prism unit 221, 223, 225, or 227 are substantially the same, all the light rays incident on the circular prism assembly 22 are refracted at the same angle in each prism unit 221, 223, 225, or 227. Therefore, it is possible to uniformly adjust the light intensity distribution. Further, since the prisms included in the first prism unit 221, the second prism unit 223, the third prism unit 225, and the fourth prism unit 227 have different slanted angles each other, it is possible to area-focus light. Since the first prism unit 221, the second prism unit 223, the third prism unit 225, and the fourth prism unit 227 all have ring shapes, light rays are area-focused in a circular shape.

FIGS. 8A to 8F show various modifications of the partial cross-sectional structure of the film sheet 100 of FIG. 1. The cross-sectional structures of film sheets 110, 120, 130, 140, 150, and 160 of FIGS. 8A to 8F are just illustrative examples of the present invention, and the present invention is not limited thereto. Therefore, the cross-sectional structure of the film sheet 100 can be modified in various forms. Further, for ease, in FIGS. 8A to 8F, only one pair of prism units of the film sheet 100 are shown.

Figure 8A:
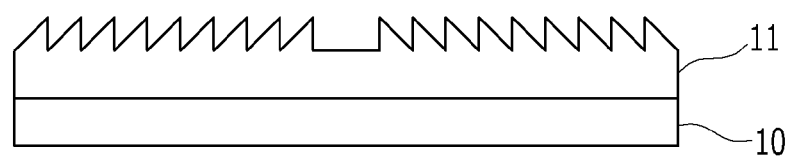
FIGS. 8A to 8F are diagrams showing various modifications of a partially sectional structure of the film sheet of FIG. 1.

As shown in FIG. 8A, the film sheet 110 includes a film 10 and a prism assembly 11. The prism assembly 11 is positioned on the film 10. The prism assembly 11 may be attached to the film 10 by an adhesive. The adhesive may use a detachable liner to attach the prism assembly 11 on the film 10. The prism assembly 11 may be formed of a transparent polymer containing silicon, for example, an invisible material, and then attached on the film 10 formed of glass.

A prism protruding upward is positioned in the center of the prism assembly 11, and surrounding prisms face the prism positioned in the center. The prism assembly 11 is formed to extend in one direction and focuses light. Meanwhile, the film 10 and the prism assembly 11 may be formed as one body. That is, since the film sheet 110 can be processed in quantity by a method of molding, embossing, or hot pressing, the film sheet 110 can be manufactured in a short time at a low cost. The thickness of the film sheet 110 may be 50 μm to 300 μm. The film sheet 110 cannot be formed to have too small a thickness because of design conditions, and in a case in which the thickness of the film sheet 110 is too large, since the film sheet 110 is not flexible, the workability decreases.

Figure 8B:
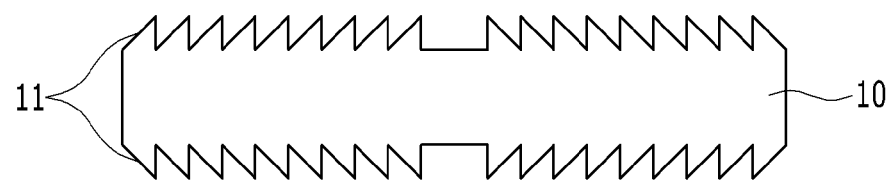

Meanwhile, as shown in FIG. 8B, the film sheet 120 that is another modification includes a film 10 and prism assemblies 11. The prism assemblies 11 are positioned on the top surface of the film 10 and below the bottom surface of the film 10. That is, a prism assembly 11 is formed below a surface, that is, the bottom surface, facing a direction becoming far from a direction that the top surface, that is, the upper plate surface of the film 10, faces. In this case, the film sheet 120 can be manufactured at almost the same cost as the manufacturing cost of the film sheet 110 of FIG. 8A. The prism assemblies 11 shown in FIG. 8B are the same as the prism assembly 11 shown in FIG. 8A. The film 10 and the prism assemblies 11 may be formed as one body at a high speed by pressing a resin, etc.

Figure 8C:
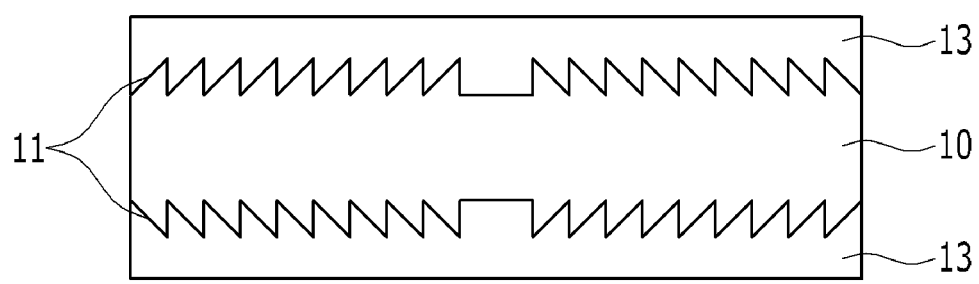

As shown in FIG. 8C, another film sheet 130 includes a film 10, prism assemblies 11, and cover films 13. Since the film 10 and the prism assemblies 11 of FIG. 8C are the same as the film 10 and the prism assembly 11 of FIG. 8A, the film 10 and the prism assemblies 11 are denoted by the same reference symbols. The film 10 and the prism assemblies 11 may be formed as one body. In a case in which the prism assemblies 11 are exposed to the outside, the prism assemblies 11 can be damaged by impact. Therefore, the individual prism assemblies 11 are covered by one pair of cover films 13 to be protected.

Figure 8D:
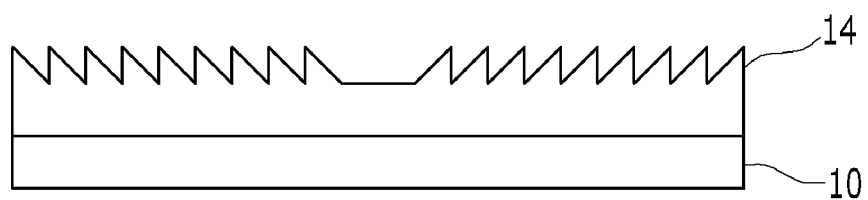

As shown in FIG. 8D, another film sheet 140 includes a film 10 and a prism assembly 14. The prism assembly 14 is positioned on the film 10. Prisms included in the prism assembly 14 face the outside from the center. Even when the prisms face the outside from the center, light rays can be refracted and area-focused by the same principle. Meanwhile, the film 10 and the prism assembly 14 may be formed as one body.

Figure 8E:
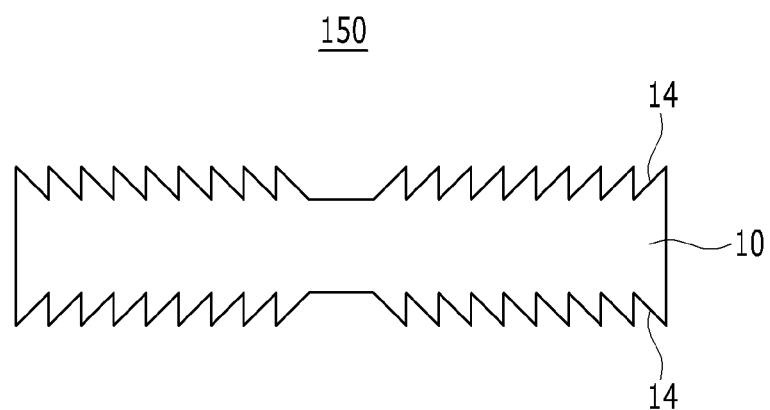

As shown in FIG. 8E, a film sheet 150 includes a film 10 and prism assemblies 14. The prism assemblies 14 are positioned on the top surface of the film 10 and below the bottom surface of the film 10. Since the prism assemblies 14 shown in FIG. 8E are the same as the prism assembly 14 shown in FIG. 8D, the prism assemblies 14 are denoted by the same reference symbol. The film 10 and the prism assemblies 14 may be formed as one body at a high speed by pressing a resin, etc.

Figure 8F:
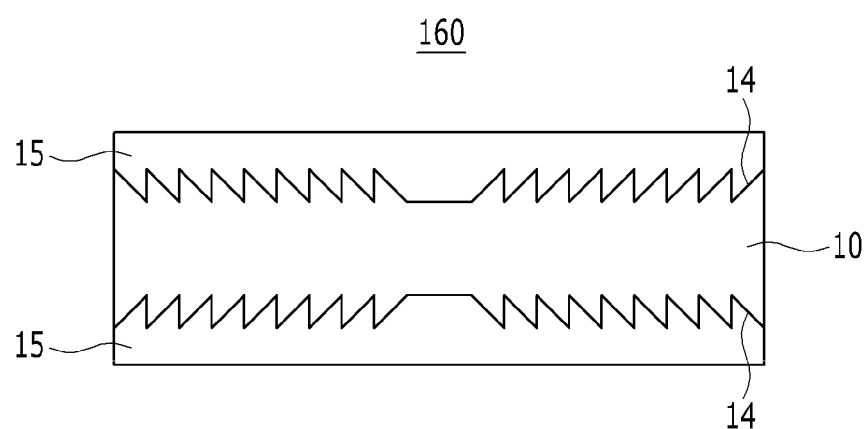

As shown in FIG. 8F, a film sheet 160 includes a film 10, prism assemblies 14, and cover films 15. Since the film 10 and the prism assemblies 14 of FIG. 8F are the same as the film 10 and the prism assemblies 14 of FIG. 8D, the film 10 and the prism assemblies 14 are denoted by the same reference symbols. The film 10 and the prism assemblies 14 may be formed as one body. In a case in which the prism assemblies 14 are exposed to the outside, the prism assemblies 14 can be damaged by impact. Therefore, the individual prism assemblies 14 are covered by one pair of cover films 15 to be protected.

Figure 9:
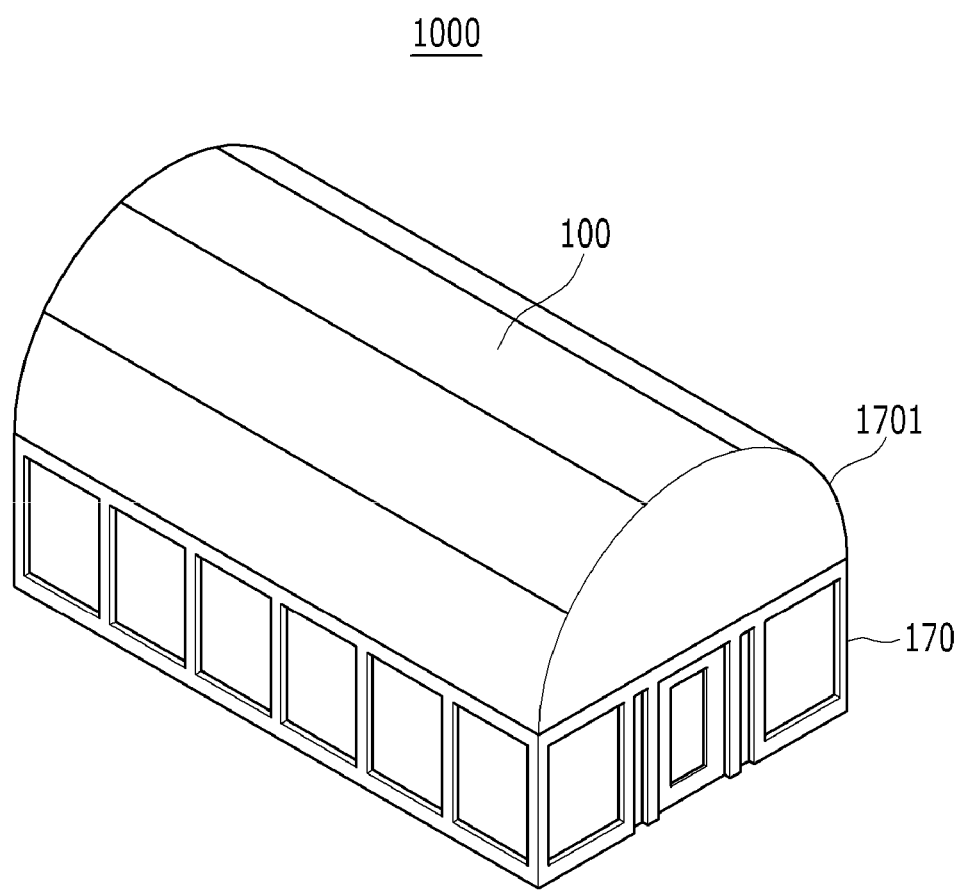
FIG. 9 is a schematic perspective view of a greenhouse provided with the film sheet of FIG. 1.

FIG. 9 is a schematic perspective view of a greenhouse 1000 provided with the film sheet 100 of FIG. 1. The structure of the greenhouse 1000 of FIG. 9 is just an illustrative example of the present invention, and the present invention is not limited thereto. Therefore, the structure of the greenhouse 1000 can be modified in different forms.

As shown in FIG. 9, the greenhouse 1000 includes a support frame 170 and a film sheet 100. Since the film sheet 100 of FIG. 9 is the same as the film sheet 100 of FIG. 1, the film sheet 100 is denoted by the same reference symbol.

As shown in FIG. 9, the support frame 170 serves as the skeleton of the greenhouse 1000. Therefore, the support frame 170 is built on the ground and then the support frame 170 is covered by the film sheet 100. The film sheet 100 can be rolled up into a roll or scroll form and be kept. Meanwhile, the support frame 170 includes a cover unit 1701 covered by the film sheet 100. The cover unit 1701 may be formed in a curved surface form by bending a pipe in a curved line form.

The film sheet 100 can efficiently focus light since the film sheet 100 includes a plurality of prisms (not shown). The plurality of prisms (not shown) extend in a y-axis direction, that is, the extension direction of the greenhouse 1000. Therefore, in a case of making a plurality of long extending cultivation regions where crops grow and paths where people can pass between the cultivation regions inside the greenhouse 1000, it is possible to adjust growth and development conditions, that is, crop growth and yields, by focusing light only onto the cultivation regions where crops grow and not on the paths. Shadows are made on the paths. This will be described below in more detail with reference to FIG. 10.

Figure 10:
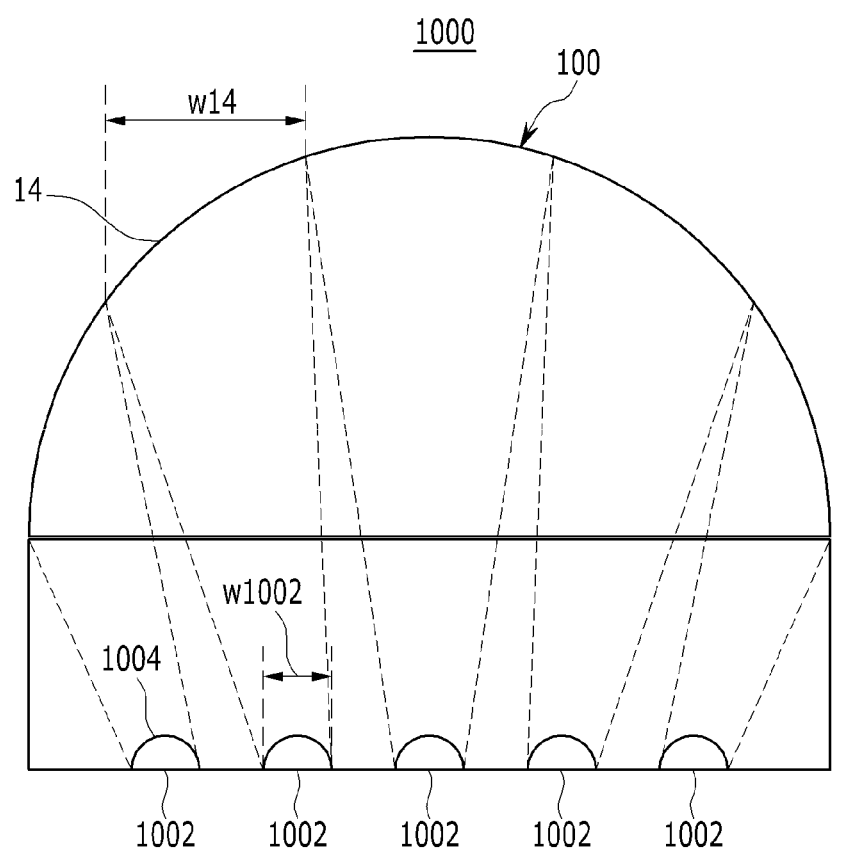
FIG. 10 is a schematic cross-sectional view illustrating the inside of the greenhouse of FIG. 9.

FIG. 10 schematically shows the internal cross-section of the greenhouse 1000 of FIG. 9. The internal cross-sectional structure of the greenhouse 1000 of FIG. 10 is just an illustrative example of the present invention, and the present invention is not limited thereto. Therefore, the internal cross-sectional structure of the greenhouse 1000 can be modified in different forms.

As shown in FIG. 10, the film sheet 100 covering the greenhouse 1000 includes a plurality of prism assemblies 14. Light rays are focused onto only the cultivation regions 1004 of crops by the prism assemblies 14. For example, as shown in FIG. 10, in a case in which 5 cultivation regions 1004 separated from each other are made and 5 prism assemblies 14 cover the greenhouse 1000, each of the prism assemblies 14 makes an area-focused region 1002 corresponding to each cultivation region 1004. Therefore, since an amount of sunlight increases while light rays are focused onto only the cultivation regions 1004, it is possible to increase yields of crops such as fruits, vegetables, or flowers located in the cultivation regions 1004. As described above, it is preferable that the width of a cultivation region 1004 be substantially the same as the width of an area-focused region 1002.

In winter, the temperature is very low and sunshine is not strong. Therefore, in order to protect plants from cold-weather damage, greenhouses are used. In a case of using the greenhouse 1000, it is possible to gather light rays and irradiate the light rays onto only predetermined regions.

Photosynthesis of crops does not occur without light. Photosynthesis of crops increases in proportion to the intensity of light, and when a specific phase passes in photosynthesis, $CO_2$ intake and $O_2$ release do not occur any more. The intensity of light at that stage is referred to as a light compensation point. In a case in which the intensity of light increases over the light compensation point, the speed of photosynthesis does not increase in proportion to the intensity of light. The intensity of light is called a light saturation point. Factors other than light can limit the speed of photosynthesis. The light saturation point depends on the kinds of crops. As a result, it is possible to adjust the intensity of light by distinguishing between crops that like strong light and crops that like weak light.

Examples of the crops that like strong light include watermelons, taros, and tomatoes. Watermelons and taros have a light saturation point of 80 klx, and tomatoes have a light saturation point of 70 klx. Examples of crops that like moderate light include cucumbers, turnips, pumpkins, celery, strawberries, eggplants, cabbage, and peas. Cucumbers and turnips have a light saturation point of 55 klx, pumpkins and celery have a light saturation point of 45 klx, and strawberries, eggplants, cabbage, and peas have a light saturation point of 40 klx. Meanwhile, examples of the crops that like weak light include bell peppers, kidney beans, and lettuce. Bell peppers have a light saturation point of 30 klx, and kidney beans and lettuce have a light saturation point of 250 klx. The intensity of light depends on seasons. On the summer solstice day, the intensity of light is 120 klx, and on the spring equinox day or the autumnal equinox day, the intensity of light is about 75 klx. Also, on the winter solstice day, the intensity of light is 30 klx. Therefore, the intensity of light reaching crops in the greenhouse 1000 is 80 klx on the summer solstice day, 50 klx on the spring equinox day or the autumnal equinox day, and 20 klx on the winter solstice day. Therefore, from the spring equinox day to the autumnal equinox day, the intensity of light satisfies photosynthesis of tomatoes, and as the winter solstice day approaches, the intensity of light cannot satisfy even cucumbers or bell peppers that do not require strong light. Therefore, since it is preferable to control the intensity of light in predetermined regions in the greenhouse 1000 according to the kinds of crops or locations where crops are planted, the intensity of light is controlled by using the film sheet 100.

The prism assembly 14 is positioned while having a curvature along the width direction thereof, that is, an x-axis direction. Since the film sheet 100 is formed of a flexible material, the prism assembly 14 can have the curvature. Here, the curvature is in inverse proportion to the width w1002 of the area-focused region 1002. That is, as the curvature of the prism assembly 14 increases, the width w1002 of the area-focused region 1002 decreases. That is, the regions onto which light rays are area-focused by the prism assembly 14 narrows. Meanwhile, the width w14 of the prism assembly 14 may be 3 to 10 times as great as the width w1002 of the area-focused region 1002 of the prism assembly 14. In a case in which the width of the prism assembly 14 is out of the above-mentioned range, the light-use efficiency may be remarkably reduced. Further, it is difficult for the width of the prism assembly 14 to be out of the above-mentioned range in the design structure of the prism assembly 14.

Figure 11:
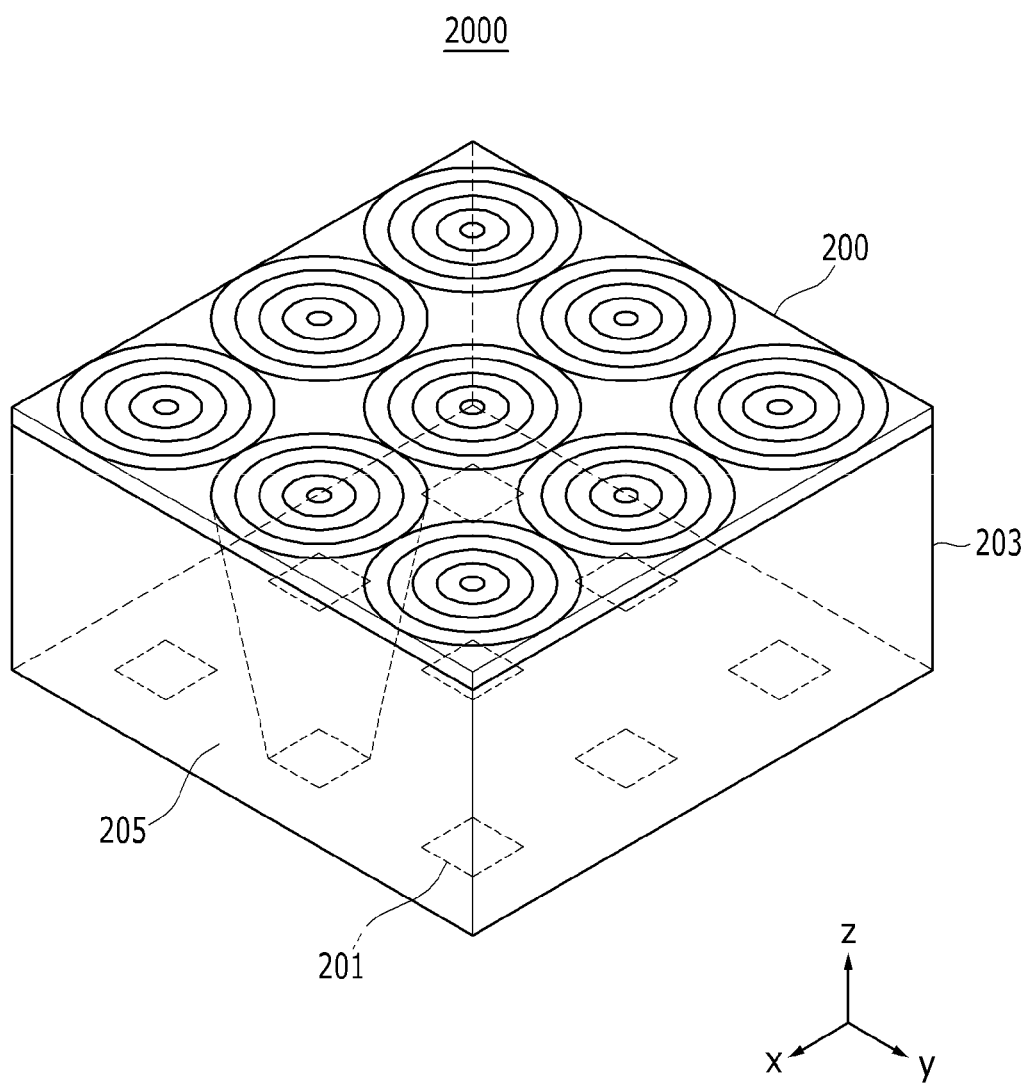
FIG. 11 is a schematic perspective view of a sunlight focusing apparatus provided with the film sheet of FIG. 3.

FIG. 11 is a schematic perspective view of a sunlight focusing apparatus 2000 provided with the film sheet 200 of FIG. 3. The structure of the sunlight focusing apparatus 2000 of FIG. 11 is just an illustrative example of the present invention, and the present invention is not limited thereto. Therefore, the structure of the sunlight focusing apparatus 2000 can be modified in various forms.

As shown in FIG. 11, the sunlight focusing apparatus 2000 includes a film sheet 200, solar batteries 201, a casing 203, and a heat radiation plate 205. In addition, the sunlight focusing apparatus 2000 may further include other components if necessary. The film sheet 200 provided in the upper part of the casing 203 gathers light rays and irradiates the light rays onto the solar batteries 201. That is, as shown by dotted lines in FIG. 11, light rays are area-focused by the film sheet 200 and the solar batteries 201 are disposed in area-focused regions, thereby being capable of maximizing the efficiency of photoelectric conversion by focusing light. Further, since it is possible to prevent the solar batteries 201 from being locally thermally deteriorated, the lifetimes of the solar batteries 201 are lengthened. Light rays incident on the film sheet 200 repeatedly uniformly enter focused areas of the solar batteries 201 and all the light rays are focused while overlapping each other. Therefore, the focused light rays have a uniform light intensity distribution in the entire focused region. Meanwhile, heat is radiated to the outside by providing the heat radiation plate 205 for preventing the solar batteries 201 from being thermally deteriorated by focusing light.

Figure 12:
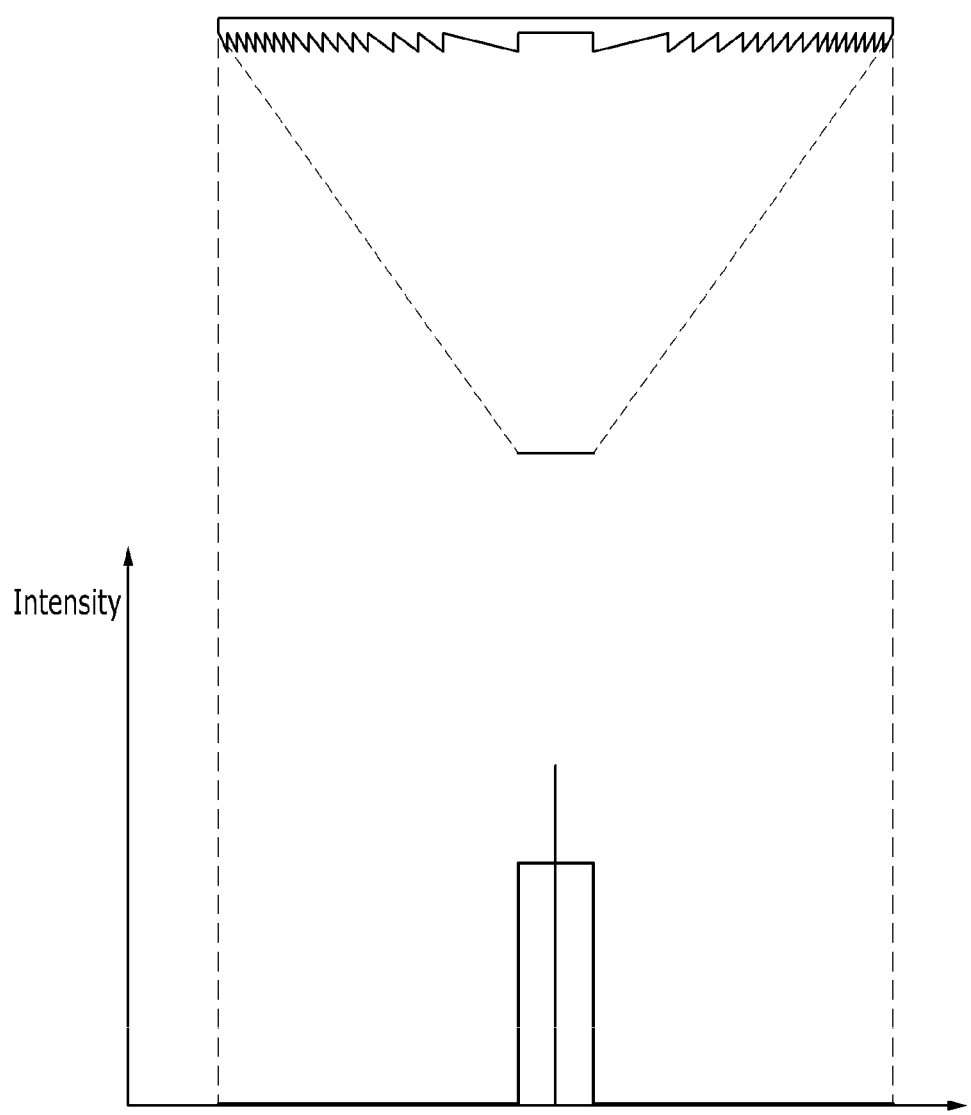
FIG. 12 is a graph illustrating measured intensities of light passing through the film sheet according to an exemplary embodiment of the present invention.
Figure 13:
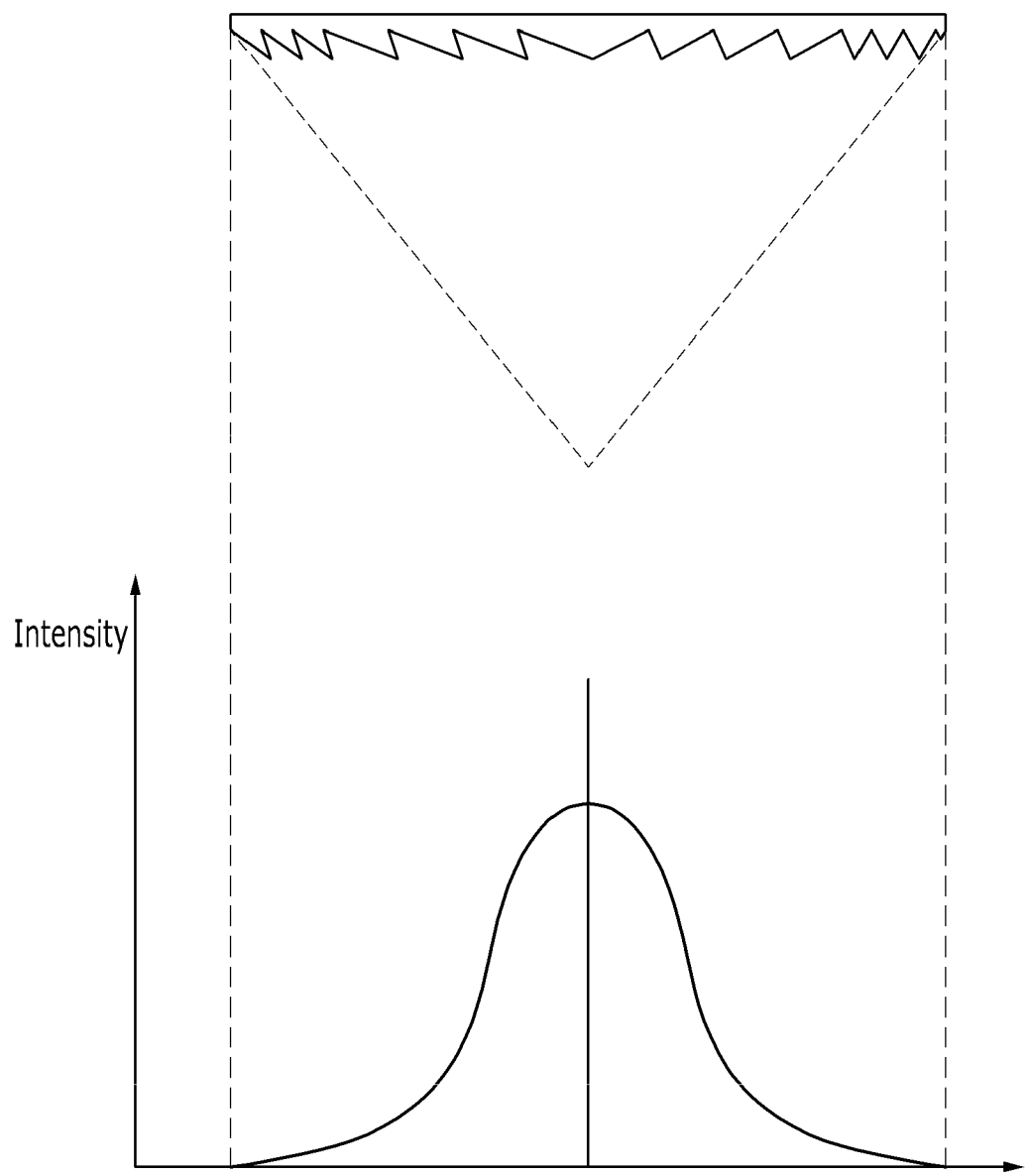
FIG. 13 is a graph showing measured intensities of light passing through a film sheet according to the related art.

FIG. 12 is a graph showing measured intensities of light passing through the film sheet according to an exemplary embodiment of the present invention, and FIG. 13 is a graph showing measured intensities of light passing through a film sheet according to the related art. Hereinafter, explanation will be made with reference to FIGS. 12 and 13 by comparing intensities of light rays passing through the film sheet according to an exemplary embodiment of the present invention and the film sheet according to the related art, respectively.

The graph of FIG. 12 is obtained by making light rays incident on the film sheet having a Fresnel lens pattern that is the same shape as the film sheet of FIG. 1 and measuring a light intensity distribution. On the upper side of FIG. 12, a cross-sectional structure of the film sheet of FIG. 1 is shown, and on the lower side of FIG. 12, a light intensity distribution of a focused area by the film sheet of FIG. 1 is shown.

As shown in FIG. 12, it can be seen that light intensity is high with reference to the center. That is, the above-mentioned result can be obtained by measuring the intensity of illumination of light refracted through the film sheet at each point by using a digital illuminometer.

That is, in a case of using the film sheet of FIG. 1, light is area-focused and the light intensity distribution is uniform over the entire focused area. Further, in a region other than the focused area, the intensity of light is almost 0. The film sheet having prisms formed in a surface thereof according to an exemplary embodiment of the present invention reduces light loss as compared to a general Fresnel lens, and makes the light intensity distribution more uniform as compared to a case in which light is focused to one focus point.

In contrast with this, as shown in FIG. 13, the following result can be obtained by making light rays incident on a Fresnel lens having prisms with general shapes and measuring light intensity distribution. Here, the prisms are formed by adjusting only the slanted angles. On the upper side of FIG. 13, the cross-sectional structure of a general film sheet is shown, and on the lower side of FIG. 13, the light intensity distribution of the focused area by the film sheet of FIG. 1 is shown.

As shown in FIG. 13, the light intensities are high in the central region and gradually become weaker going away from the central region so as to be bell-shaped. That is, the light exhibits a Gaussian distribution. Therefore, according to the related art, the focusing efficiency is low and all the parallel light rays do not have a uniform light intensity distribution in a predetermined region of the focused area.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A greenhouse comprising:
   a support frame including a cover unit; and
   a film sheet at least partially covering the cover unit,
   wherein the film sheet includes a film and a first plurality of prism assemblies arranged on the film to neighbor each other,
   wherein a selected one prism assembly of the first plurality of prism assemblies includes (a) a first prism unit including a plurality of first prisms with slanted angles that are substantially the same as each other, and (b) a second prism unit neighboring the first prism unit and including a plurality of second prisms with slanted angles that are substantially the same as each other,
   wherein the film sheet includes a second plurality of prism assemblies arranged on an opposite side of the film with respect to the first plurality of prism assemblies,
   wherein a selected one prism assembly of the second plurality of prism assemblies includes (a) a third prism unit including a plurality of third prisms with slanted angles that are substantially the same as each other, and (b) a fourth prism unit including a plurality of fourth prisms with slanted angles that are substantially the same as each other,
   wherein a width of the first prism unit and a width of the second prism unit are substantially the same,
   wherein the slanted angles of the plurality of first prisms are different from the slanted angles of the plurality of second prisms, wherein the slanted angles of the plurality of third prisms are different from the slanted angles of the plurality of fourth prisms, wherein the film sheet includes a first cover film at least partially covering the first plurality of prism assemblies with a substantially planar surface, and wherein the film sheet includes a second cover film at least partially covering the second plurality of prism assemblies with a substantially planar surface, and wherein the first plurality of prism assemblies are positioned on the film sheet so as to produce alternating elongate regions of shadow and elongate regions of focused light on a floor region of the greenhouse when the greenhouse is exposed to sunlight.

2. The greenhouse of claim 1, wherein the plurality of first prisms and the plurality of second prisms are formed to extend in a direction in which the greenhouse extends.

3. The greenhouse of claim 1, wherein the slanted angle of the plurality of second prisms is greater than the slanted angle of the plurality of first prisms.

4. The greenhouse of claim 3, wherein the number of the plurality of second prisms is greater than the number of the plurality of first prisms.

5. The greenhouse of claim 3, wherein a height of the plurality of first prisms and a height of the plurality of second prisms are substantially the same, and a length of slanted surfaces of the plurality of first prisms and a length of slanted surfaces of the plurality of second prisms are substantially the same.

6. The greenhouse of claim 1, wherein the first plurality of prism assemblies are positioned on the film sheet so as to focus light incident on the film sheet onto a target focus area with substantially uniform intensity across the target focus area; and the selected one prism assembly of the first plurality of prism assemblies has a width that is 3 to 10 times larger than a width of the target focus area.

\* \* \* \* \*